US009855990B2

(12) United States Patent
Meggiolan et al.

(10) Patent No.: US 9,855,990 B2
(45) Date of Patent: Jan. 2, 2018

(54) HYDRAULIC BRAKE CONTROL DEVICE FOR A HANDLEBAR OF BICYCLE

(71) Applicant: Campagnolo S.r.l., Vicenza (IT)

(72) Inventors: Mario Meggiolan, Creazzo (IT); Davide Zenere, Vicenza (IT); Jürgen Beier, Ulm (DE)

(73) Assignee: CAMPAGNOLO S.R.L., Vicenza (IT)

(*) Notice: Subject to any disclaimer, the term of this patent is extended or adjusted under 35 U.S.C. 154(b) by 0 days.

(21) Appl. No.: 14/933,623

(22) Filed: Nov. 5, 2015

(65) Prior Publication Data
US 2016/0129968 A1    May 12, 2016

(30) Foreign Application Priority Data

Nov. 6, 2014 (IT) .............. MI2014A1899

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01)

(58) Field of Classification Search
CPC ................. B62L 3/023; B62K 23/06
See application file for complete search history.

(56) References Cited

U.S. PATENT DOCUMENTS

| 4,921,081 A | 5/1990 | Chilcote |
| 5,813,501 A * | 9/1998 | Terry, Sr. ............. B60T 11/165 188/24.11 |
| 6,003,639 A | 12/1999 | Buckley et al. |
| 6,073,730 A | 6/2000 | Abe |
| 8,272,292 B2 | 9/2012 | De Perini |
| 2005/0016312 A1 | 1/2005 | Dal Prà |

(Continued)

FOREIGN PATENT DOCUMENTS

| CH | 707040 A2 | 3/2014 |
| EP | 0878383 A2 | 11/1998 |

(Continued)

OTHER PUBLICATIONS

Extended European Search Report for Application No. 15191461.1, dated Mar. 22, 2016.

(Continued)

*Primary Examiner* — Bradley King
(74) *Attorney, Agent, or Firm* — Volpe and Koenig, P.C.

(57) ABSTRACT

The present invention provides an integrated control device of hydraulic brake for a handlebar of bicycle. The integrated control device includes a brake actuator of hydraulic type mounted on a housing body. The housing body comprises a handgrip portion and an attachment portion to the bicycle handlebar. The brake actuator includes a brake lever hinged on the housing body through a pin. A hydraulic cylinder is provided wherein a slidable piston is slidable that is kinematically connected to the brake lever through kinematic connection elements. A tank for hydraulic fluid is in fluid communication with the hydraulic cylinder. The control device includes an autonomous cartridge that comprises the hydraulic cylinder and the tank, and is removably inserted into a corresponding seat of the housing body. The seat is formed in a head portion of the housing body that is substantially opposite the attachment portion.

18 Claims, 8 Drawing Sheets

(56) References Cited

U.S. PATENT DOCUMENTS

| | | | |
|---|---|---|---|
| 2006/0086588 A1* | 4/2006 | Tsumiyama | B62L 3/023 |
| | | | 192/217 |
| 2008/0210046 A1 | 9/2008 | De Perini | |
| 2009/0152062 A1 | 6/2009 | Tsai | |
| 2011/0048873 A1 | 3/2011 | Wang | |
| 2012/0240715 A1 | 9/2012 | Tsai | |
| 2014/0174236 A1 | 6/2014 | Nakakura et al. | |
| 2015/0083531 A1* | 3/2015 | Abhold | B62K 23/06 |
| | | | 188/151 R |
| 2016/0129966 A1* | 5/2016 | Meggiolan | B62L 3/023 |
| | | | 74/491 |
| 2016/0177976 A1* | 6/2016 | Ruopp | B60T 11/16 |
| | | | 60/592 |

FOREIGN PATENT DOCUMENTS

| | | |
|---|---|---|
| EP | 1473220 A1 | 11/2004 |
| EP | 1964761 A2 | 9/2008 |
| EP | 1964763 A1 | 9/2008 |
| EP | 2615020 A2 | 7/2013 |
| EP | 2749484 A1 | 7/2014 |
| EP | 2749487 A1 | 7/2014 |
| EP | 2749488 A1 | 7/2014 |

OTHER PUBLICATIONS

Italian Search Report and Written Opinion in Italian Application No. IT MI2014A001899, with English translation.
European Office Action for Application 15 191 461.1-1755 dated, Mar. 29, 2017.

\* cited by examiner

HYDRAULIC BRAKE CONTROL DEVICE FOR A HANDLEBAR OF BICYCLE

CROSS REFERENCE TO RELATED APPLICATION

This application claims the benefit of Italian Application No. MI2014A001899, which was filed on Nov. 6, 2014, and is incorporated herein by reference as if fully set forth.

FIELD OF INVENTION

The present invention relates to a hydraulic brake control device for a handlebar of bicycle.

BACKGROUND

In modern bicycles, in particular in high performance ones, it is spreading the use of on-board equipment that uses hydraulic controls. This is the case for example of hydraulic disc braking systems, in which the force necessary to obtain a suitable braking by means of the closing of the braking calipers on the discs is too high to be able to be easily exerted with the normal cable systems, controlled by the hands of the cyclist. With these braking systems, therefore, the effort exerted by the hand of the cyclist is transferred to a hydraulic group; more specifically, a piston is actuated that pressurizes oil inside a cylinder. The pressurised oil is then transferred through suitable tubes to the brake calipers, to obtain the braking.

As well as the disc braking systems, also other equipment could usefully use a hydraulic control. In particular, with reference again to the braking system, hydraulic rim braking systems are also known, in which braking calipers act on the rim of the bicycle wheel, and not on discs like in the previous case.

There are also known integrated control devices of the hydraulic brake and of the gear, front and rear (i.e. acting on the toothed wheels of the crankset of the bicycle and, respectively, on the sprockets of the sprocket assembly mounted on the rear wheel).

In any case, the control devices of the hydraulic brake are generally mounted at the two ends of a bicycle handlebar, and act on the braking of the front and rear wheels.

Document EP 2749487 discloses a hydraulic brake control device, integrated with a control device of mechanical gear (i.e. the actuation of which is of mechanical type).

The brake and gear actuators are mounted on a housing body comprising a handgrip portion and an attachment portion to the bicycle handlebar. In particular, the brake actuator comprises:

a brake lever hinged on the housing body through a pin;

a hydraulic cylinder wherein a piston is slidable that is kinematically connected to the brake lever through a connecting rod and a shaped plate, an end of the connecting rod being pivoted to said piston and the opposite end acting on the shaped plate, the shaped plate being associated with the brake lever;

a return spring provided between the piston and an inner wall of the cylinder;

a tank for hydraulic fluid in fluid communication with the hydraulic cylinder.

The hydraulic cylinder and the tank are made in one piece with the housing body, in particular the housing body provides a substantially cylindrical cavity that defines the inner walls of the cylinder wherein the piston slides and that houses the contrast spring.

Document US 2012/0240715 discloses a hydraulic brake control device, in which the brake actuator is mounted on a housing body comprising a handgrip portion and an attachment portion to the bicycle handlebar. In particular, the brake actuator comprises:

a brake lever hinged on the housing body through a pin;

a hydraulic cylinder wherein a piston is slidable that is kinematically connected to the brake lever through a connecting rod, an end of the connecting rod being pivoted to said piston and the opposite end being associated with the brake lever;

a return spring provided between the piston and an inner wall of the cylinder;

The hydraulic cylinder is made on a hydraulic unit that is hidden inside the housing body, and can be made in one piece with the housing body itself. In any case it is provided a covering case—made from rubber, plastic or light alloy—that covers the housing body and consequently also the hydraulic cylinder.

The Applicant has found that the aforementioned control devices of the hydraulic brake have various drawbacks.

Firstly, the aforementioned hydraulic brake control devices have a difficult maintenance for the hydraulic components (in particular for the piston and tank), since—in order to access them—it is necessary to dismount and remount the outer walls of the housing body and of the covering case (in the case of the device according to US 2012/0240715).

Another drawback found by the Applicant for the device according to EP 2749487 is linked to the use of the kinematic mechanism formed by connecting rod and shaped plate as connections between piston and brake lever. Such a kinematic mechanism must be mounted with precision and only a part of the force exerted by the user on the brake lever reflects onto the piston along its axis, whereas a substantial part of the force exerted by the user is dispersed in the kinematic mechanism itself.

SUMMARY OF THE INVENTION

To address the technical problems described above, the technical solution of the present invention provides a hydraulic brake control device for a bicycle handlebar that has reliability, easiness of maintenance, practicalness of assembly and of adjustment of the rest position and of the position of braking start of the brake lever with respect to the housing body, so as to overcome the drawbacks of the prior art.

BRIEF DESCRIPTION OF THE DRAWINGS

Further features and advantages of the invention will become clearer from the following description of a preferred embodiment thereof, made with reference to the attached drawings. In such drawings:

FIGS. 7a and 7b are enlarged section views analogous to those of FIGS. 6a and 6b respectively, but taken on a plane VII-VII parallel to the plane IV-IV according to which the sections of FIGS. 6a and 6b are taken.

DETAILED DESCRIPTION OF THE PREFERRED EMBODIMENTS

Figure 1:
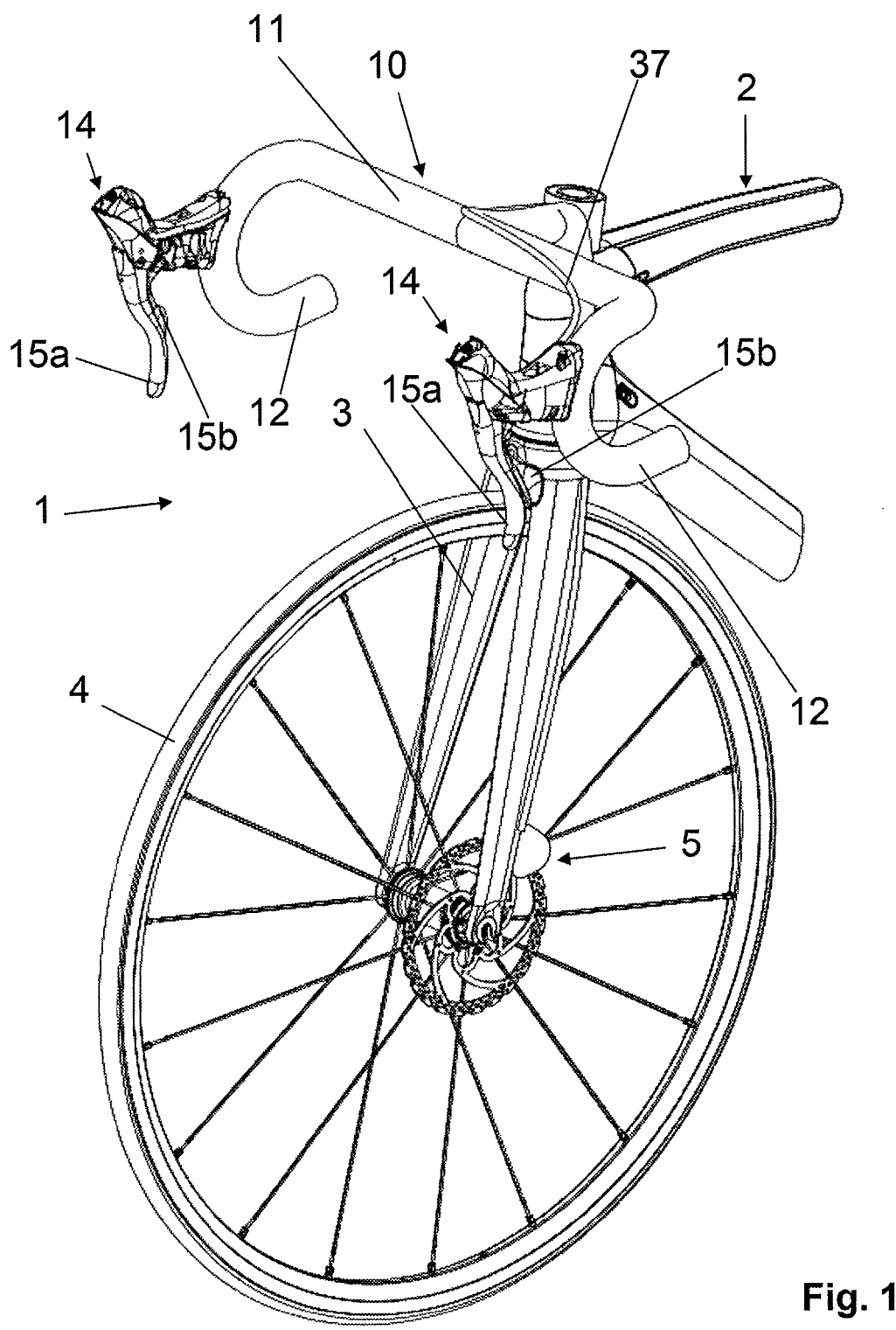
FIG. 1 is a perspective view of part of a bicycle, with a handlebar and two relative hydraulic brake control devices according to the invention.

In the present description and in the subsequent claims reference will be made to hydraulic brake control devices (i.e. the actuation of which is of hydraulic type), which may or may not be integrated with gear control devices.

The present invention, in a first aspect thereof, relates to a hydraulic brake control device for a bicycle handlebar.

Preferred features of the aforementioned hydraulic brake control device are disclosed. In particular, in one embodiment the control device comprises a gear actuation device, so as to form an integrated control of hydraulic brake and gear.

The present invention, in a second aspect thereof, relates to a bicycle handlebar comprising a hydraulic brake control device.

In particular, the present invention relates to a hydraulic brake control device for a bicycle handlebar, comprising a brake actuator of hydraulic type mounted on a housing body, said housing body comprising a handgrip portion and an attachment portion to the bicycle handlebar, wherein said brake actuator comprises:

a brake lever hinged on said housing body through a pin;

a hydraulic cylinder wherein a piston is slidable that is kinematically connected to said brake lever through kinematic connection elements;

a tank for hydraulic fluid in fluid communication with said hydraulic cylinder;

characterized in that said control device comprises an autonomous cartridge that comprises said hydraulic cylinder and said tank and that is removably inserted into a corresponding seat of said housing body, said seat being formed in a head portion of said housing body that is substantially opposite said attachment portion.

Advantageously, providing such an autonomous cartridge removably inserted into the seat formed in the head portion of the housing body allows an easy mounting and a quick maintenance.

Furthermore, the designer advantageously has the possibility to choose different materials to make the housing body and the cartridge. Typically he can choose a material adapted to withstand the pressurised oil and the rubbing of the gaskets of the piston for the cartridge (for example a metallic material such as aluminum or steel) and a lighter material for the housing body (for example a composite material).

The hydraulic brake control device of the present invention can comprise one or more of the following preferred features, taken individually or in combination.

Preferably, said cartridge—when inserted into the seat—faces outside of the housing body.

More preferably, said cartridge comprises a grip portion accessible from outside of the control device when it is mounted on the handlebar.

Advantageously, providing such a cartridge allows an easy maintenance and also a quick replacement of the cartridge in case in which the cylinder and tank are damaged, without it being necessary to dismount and remount outer walls of the housing body as happens in the prior art.

Preferably, at least part of said kinematic connection elements are mounted on said cartridge.

Advantageously, this allows the mounting operations to be simplified, given that with the insertion of the cartridge into the seat there is the simultaneous correct positioning of part of the kinematic connection elements.

Preferably, said cartridge comprises a hole wherein said pin of said brake lever is inserted, when said cartridge is inserted into said seat.

Advantageously, the pin itself of the brake lever also determines the correct insertion positioning of the cartridge into the seat, without other fixing elements of the cartridge being necessary. This also ensures the best precision of mutual positioning between brake lever and cartridge, so as to give the maximum precision of actuation.

Preferably, a shape coupling is provided between said cartridge and said seat.

In accordance with a preferred embodiment of the control device of the invention, said kinematic connection elements comprise a single hammer acting between said piston and said brake lever.

Advantageously, in this way the kinematic chain between piston and brake lever is extremely reliable.

Preferably, said hammer is hinged on said housing body through said pin.

Advantageously, the brake lever and the hammer rotate about the same axis so that the rotation torque imparted to the brake lever is directly transferred to the hammer, with a minimal dispersion of torque due to friction.

Preferably, said hammer is substantially U-shaped and comprises a hole where said pin is inserted and a thrust end acting on said piston.

More preferably, said hammer is positioned so that said thrust end acts on said piston in substantially axial direction.

Advantageously, in this way the force imparted by the brake lever is transferred from the hammer to the piston in particularly efficient manner.

Preferably, said control device comprises adjustment members adapted for adjusting the rest position and/or the position of braking start of said brake lever with respect to said housing body.

Advantageously, such adjustment members allow a suitable adaptation to the dimensions and physiological characteristics of the cyclist's hands (adjustment of the rest position of the brake lever) and/or a desired grade of response promptness of the braking (adjustment of the position of braking start of the lever) that depends on the technical, sporting and also competitive characteristics of the cyclist.

Preferably, said adjustment members comprise an adjustment screw screwed within a threaded hole associated with said brake lever, said adjustment screw acting in abutment on said hammer.

Advantageously, screwing or unscrewing the adjustment screw substantially changes the rest position of the brake lever, i.e. when the brake lever is completely released by the cyclist.

Preferably, said adjustment members comprise a substantially cylindrical selector having a cam-shaped outer profile that cooperates with said hammer, said selector being rotatable in a predetermined number of positions in which said hammer substantially changes an initial rest position of said piston in said hydraulic cylinder into a respective predetermined number of initial rest positions.

Advantageously, such a selector is rotated by the cyclist to easily set the grade of response promptness of the braking desired by him.

Preferably, said selector is mounted on said cartridge.

Advantageously, this makes it possible to simplify the mounting operations, given that with the insertion of the cartridge into the seat there is the simultaneous correct positioning of the aforementioned selector.

Preferably, said hammer comprises, at an opposite end with respect to said thrust end, a contact element cooperating with said cam-shaped outer profile of said selector.

More preferably, said adjustment screw acts in abutment on said hammer on the opposite part of said opposite end of the hammer with respect to said hole of the hammer, a spring acting between said opposite end of said hammer and said brake lever.

Advantageously, the spring ensures the contact between brake lever and hammer.

Preferably, said brake actuator comprises a return spring preferably provided between said piston and an inner wall of said hydraulic cylinder.

Advantageously, the return spring allows the brake lever to be brought back into the completely released rest position when the cyclist stops actuating the brake lever.

Preferably, said hydraulic cylinder comprises a side hole equipped with a joining duct to a braking tube connected to the bicycle brake.

More preferably, said cartridge is equipped with an outer reloading/discharging hole in fluid communication with said hydraulic cylinder or with said tank to reload fluid or discharge air.

As stated above, said cartridge is preferably made from different material with respect to said housing body, preferably with greater structural strength with respect to it.

Advantageously, for the cartridge it is possible to choose a material adapted to withstand the pressurised oil and the rubbing of the gaskets of the piston (for example a metallic material such as aluminum or steel), whereas for the housing body it is possible to choose a lighter material (for example a composite material).

In accordance with a preferred embodiment of the hydraulic brake control device of the invention, a gear actuation device is also mounted on said housing body and comprises a gear lever and/or button forming an integrated control of hydraulic brake and gear.

Preferably, said gear actuator is of mechanical or electric type.

With initial reference to FIG. 1, reference numeral 1 globally indicates a high-performance bicycle, of which a frame 2, a fork 3 and a front wheel 4 are at least partially visible. The bicycle 1 is provided with disc brakes 5, the front brake of which is visible.

A handlebar 10 is mounted on the fork 3. The handlebar 10 comprise a handlebar rod 11 provided at its two ends with respective handgrips 12, for example of the curved type as shown in FIG. 1.

The handlebar 10 comprises at the handgrips 12 respective hydraulic brake control devices 14 according to the invention.

Now with reference to FIGS. 2, 3, 4a, 4b and 4c, every control device 14 comprises a brake actuator 14a of hydraulic type. In the non-limiting example illustrated, the control device 14 is an integrated control device of hydraulic brake and gear, and also comprises a gear actuation device 14b.

The brake actuator 14a and the gear actuation device 14b (the latter in the case in which it is present) are mounted on a same housing body 20 comprising a handgrip portion 20a and an attachment portion 20b to the handlebar 10 of bicycle 1.

The brake actuator 14a comprises a brake lever 15a hinged on the housing body 20—near an end of the brake lever 15a itself—through a pin 22. The housing body 20 comprises at least one hole 20c (generally two opposite holes) where the pin 22 is arranged. The end of the brake lever 15a comprises at least one hole 15c where the pin 22 is arranged. The brake lever 15a is arranged on a lower portion 20e of the housing body 20, which is substantially opposite the handgrip portion 20a.

In the non-limiting example illustrated, the gear actuation device 14b is of mechanical type and comprises a gear lever 15b. In the non-limiting example illustrated, the gear lever 15b is arranged on the lower portion 20e of the housing body 20, positioned more towards the handlebar 10 with respect to the brake lever 15a. Alternatively, the gear actuation device 14b could be of electric type. In this case, alternatively or in addition to the gear lever 15b, a gear actuation button is provided.

Figure 2:
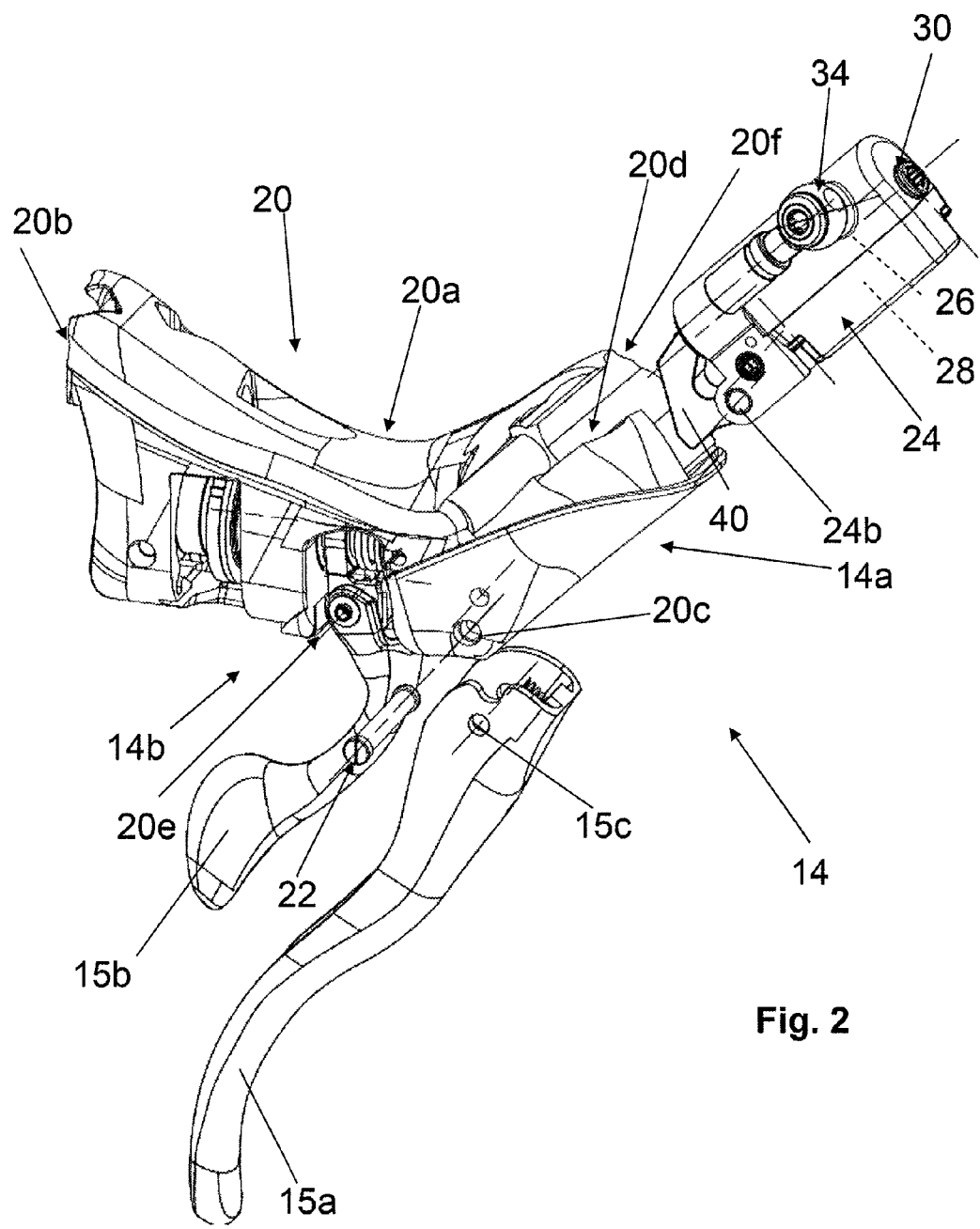
FIG. 2 is an exploded perspective view of one of the hydraulic brake control devices of FIG. 1.
Figure 3:
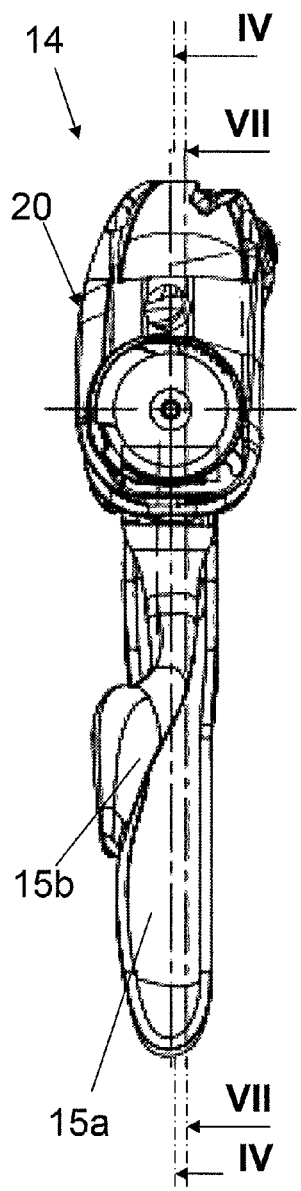
FIG. 3 is a rear elevation view, taken from the handlebar, of the hydraulic brake control device of FIG. 2, in assembled configuration.

In accordance with a feature of the invention, the brake actuator 14a of the control device 14 comprises an autonomous cartridge 24 that is removably inserted into a corresponding seat 20d of the housing body 20 (FIG. 2). The seat 20d is formed in a head portion 20f of the housing body 20, which is substantially opposite the attachment portion 20b. The cartridge 24—when inserted into the seat 20d—faces outside of the housing body 20. A shape coupling between the cartridge 24 and the seat 20d is advantageously provided.

The cartridge 24 is preferably made from different material with respect to the housing body 20, and is generally made from a material with greater structural strength than it.

For the cartridge 24 a material adapted to withstand the pressurised oil and the rubbing of the gaskets of the piston (for example a metallic material such as aluminium or steel) is generally chosen, whereas for the housing body 20 a lighter material (for example a composite material, formed from a matrix of polymeric material in which structural fibres such as carbon fibres or similar are included) is generally chosen.

A grip portion 24a of the cartridge 24 is accessible from outside of the control device 14 when it is mounted on the handlebar 10.

The cartridge 24 comprises a hole 24b wherein the pin 22 of the brake lever 15a is inserted, when the cartridge 24 is inserted into said seat 20d. The hole 24b of the cartridge 24 is then mounted coaxially to the hole 20c of the housing body 20, so as to allow the positioning of the single pin 22.

Figure 4A:
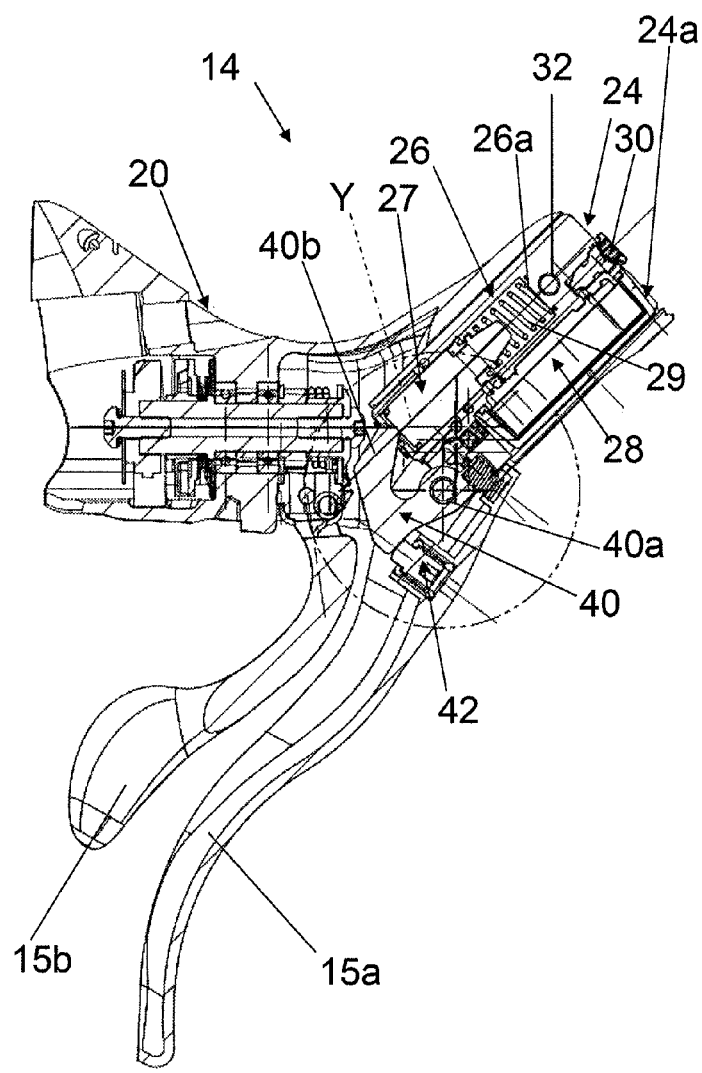
FIG. 4*a* is a section view of the hydraulic brake control device of FIG. 3, taken on the plane IV-IV of FIG. 3.
Figure 4B:
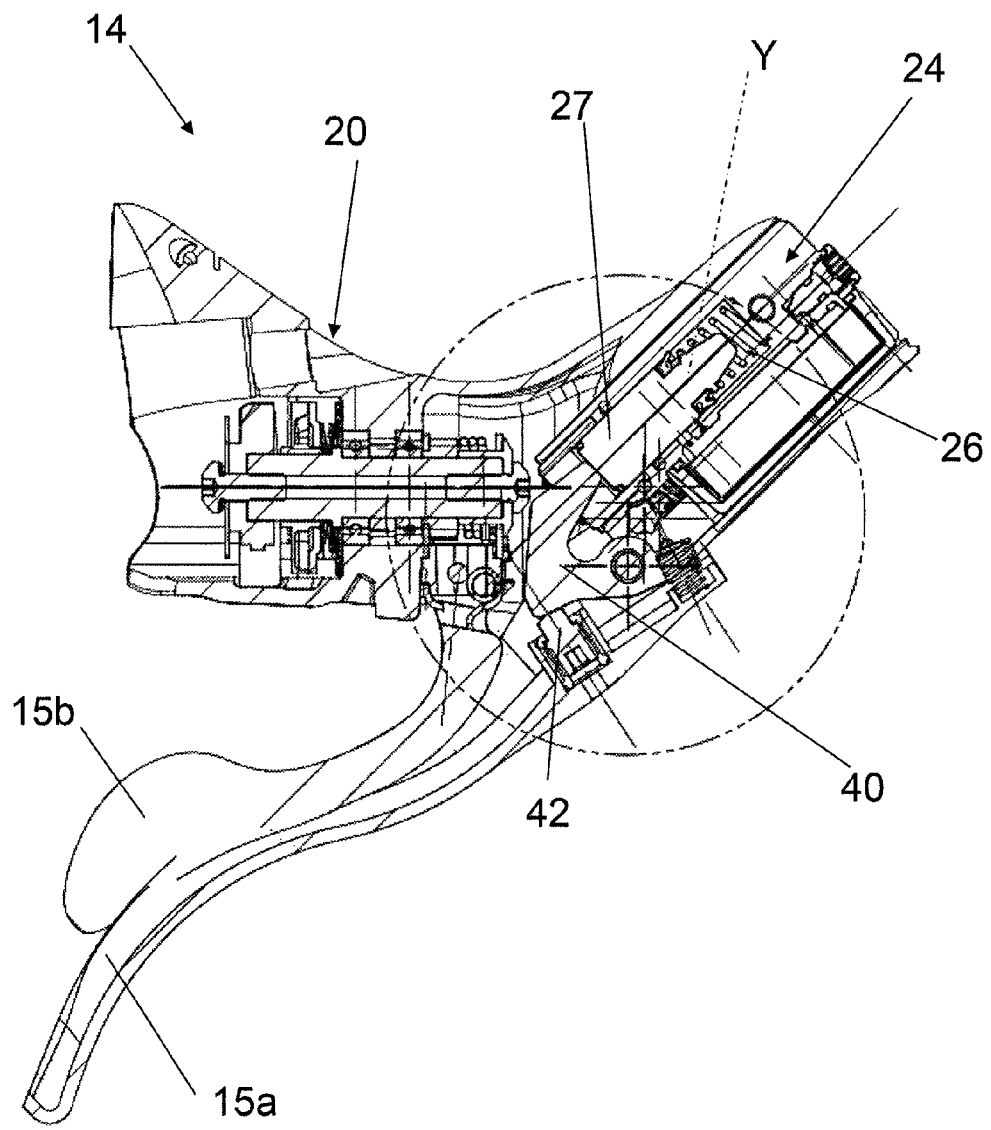
FIG. 4b is a section view of the hydraulic brake control device that is analogous to that of FIG. 4a, but in a braking configuration.
Figures 4C, 5C:
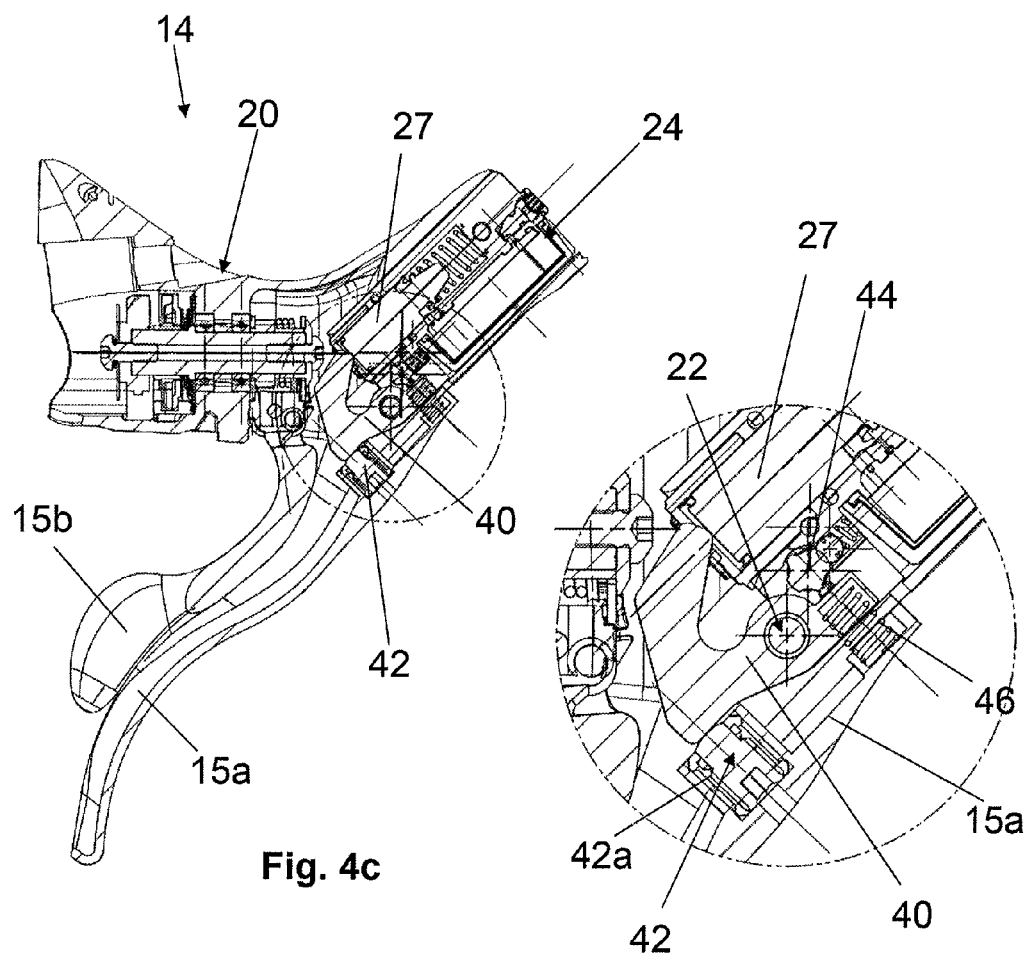
FIG. 4c is a side elevation view of the integrated brake control device that is analogous to that of FIG. 4a, but with an adjustment screw (being part of adjustment members of a brake lever) in retracted position.
FIG. 5c is an enlarged view of the part circled with a dotted and dashed line in FIG. 4c.

In the cartridge 24 a hydraulic cylinder 26 and a tank 28 for hydraulic fluid are formed, the tank 28 being in fluid communication with the hydraulic cylinder 26 (FIGS. 4a, 4b and 4c).

In the hydraulic cylinder 26 a piston 27 is slidable in sealed manner, kinematically connected to the brake lever 15a through kinematic connection elements.

The cartridge 24 is equipped with an outer reloading/discharging hole, closed by a removable cap 30 and in fluid communication with the hydraulic cylinder 26 or with the tank 28 to reload fluid or discharge air.

In the hydraulic cylinder 26 and in the tank 28 there is a fluid, in particular oil (not highlighted in the figures), intended to be pressurised as will be illustrated hereafter.

The hydraulic cylinder 26 comprises a side hole 32, equipped with a joining duct 34 to a braking tube 37 connected to the brake 5. The tube 37 carries pressurised fluid to one of the brakes 5 (front or rear), where the pressurised fluid is used to control a brake caliper on a brake disc, in per se known way and not illustrated.

The brake actuator 14a comprises a return spring 29 to bring the brake lever 15a back into the completely released rest position (shown for example in FIG. 4a). The return spring 29 is for example of helicoidal type and is preferably provided between the piston 27 and an inner wall 26a of the hydraulic cylinder 26.

As far as the aforementioned kinematic connection elements are concerned, in the non-limiting example illustrated, they comprise a single hammer 40 acting between the piston 27 and the brake lever 15a.

The hammer 40 is hinged on the housing body 20 through the pin 22.

The hammer 40 is substantially U-shaped. It comprises a hole 40a where the pin 22 is inserted and a thrust end 40b acting on the piston 27.

The hole 40a of the hammer 40 is thus mounted coaxially to the hole 24a of the cartridge 24 and to the hole 20c of the housing body 20, so as to allow the positioning of the single pin 22.

As shown in FIG. 2, the hammer 40 is preferably mounted on the cartridge 24 before it is inserted into the seat 20d of the housing body 20. This can be done through a connection bush of the holes 24a and 40a, the pin 22 being then introduced into such bush at the act of the locking in position of the cartridge 24 inserted into the seat 20d of the housing body 20.

The hammer 40 is positioned so that the thrust end 40b acts on the piston 27 in substantially axial direction, i.e. along the axis Y of the hydraulic cylinder 26.

Figure 5A:
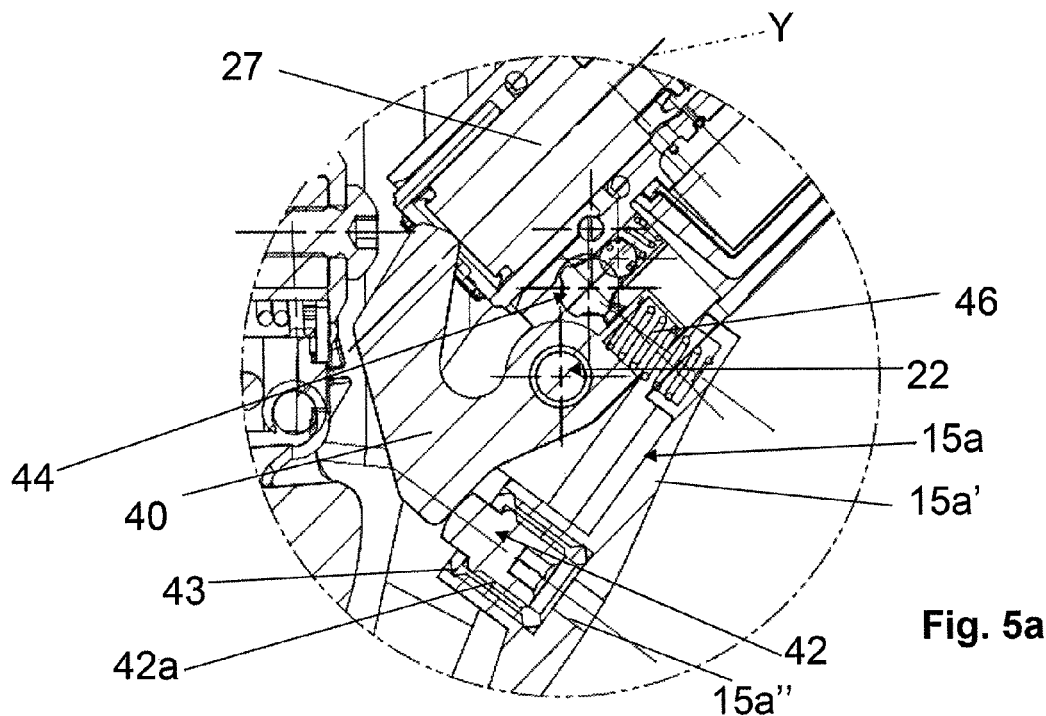
FIGS. 5a and 5b are enlarged views of the parts circled with a dotted and dashed line in FIGS. 4a and 4b respectively.
Figure 5B:
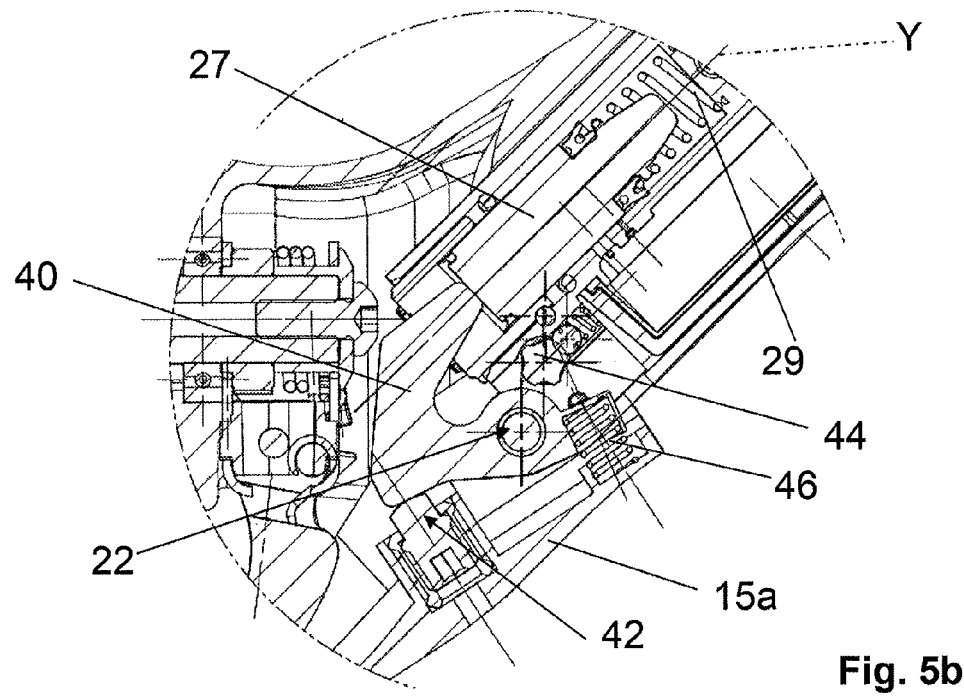

FIGS. 4a and 4b (and the relative enlargements of FIGS. 5a and 5b) show the brake actuator 14a in rest configuration and in a braking configuration, respectively (in FIGS. 4a and 5a the brake lever 15a is in the completely released rest position, whereas in FIGS. 4b and 5b the brake lever 15a is in a braking position). From the comparison of FIGS. 5a and 5b it is very clear that the thrust end 40b acts on the piston 27 in substantially axial direction.

In order to allow a suitable adaptation to the dimensions and physiological characteristics of the hands of the cyclist and/or a desired grade of response promptness of the braking, the control device 14 further comprises adjustment members adapted for adjusting the rest position and/or the position of braking start of the brake lever 15a with respect to the housing body 20.

The adjustment of the rest position of the brake lever 15a is essentially carried out through an adjustment screw 42, which determines the position of the brake lever 15a with respect to the hammer 40 in a condition of brake lever 15a completely released.

The adjustment of the position of braking start of the brake lever 15a is essentially carried out through a substantially cylindrical selector 44, which determines the position of the hammer 40 with respect to the housing body 20 in a condition of braking start.

The adjustment screw 42 is screwed within a threaded hole 42a associated with the brake lever 15a. The threaded hole 42a (see FIGS. 5a, 5b and 5c) is made directly on a cavity of the brake lever 15a, or on a bush insert 43 associated with the brake lever 15a (in particular, in the case of brake lever 15a made from composite material, a bush insert 43 made from metallic material is generally used).

Preferably, the adjustment screw 42 never projects from an outer surface 15a' (i.e. that being on the opposite part with respect to the handlebar 10) of the body of the brake lever 15a, and is actuated with a tool (for example an Allen key) through a through hole 15a" provided on the brake lever 15a and that starts from the outer surface 15a'

The adjustment screw 42 acts in abutment on the hammer 40 and projects from the body of the brake lever 15a (towards the hammer 40) by an amount determined by its screwing in the threaded hole 42a.

FIGS. 4a and 4c (and the relative enlargements of FIGS. 5a and 5c) show the adjustment screw 42 in two different screwing positions in the rest configuration of the brake lever 15a. In particular, in FIGS. 4a and 5a the adjustment screw 42 is more projecting than in FIGS. 4c and 5c, so that the brake lever 15a is more away from the handlebar 10 with respect to FIGS. 4c and 5c. From the comparison of FIGS. 5a and 5c, it is also very clear that in FIG. 5a the brake lever 15a is more away from the gear lever 15b than in FIG. 5c.

Figure 7A:
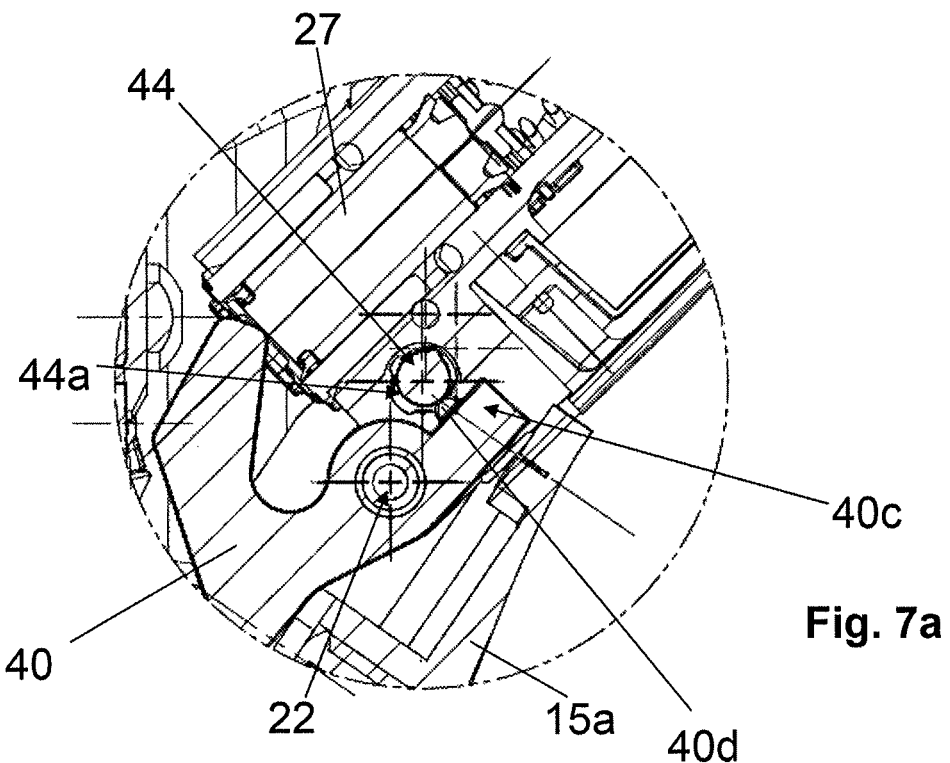
Figure 7B:
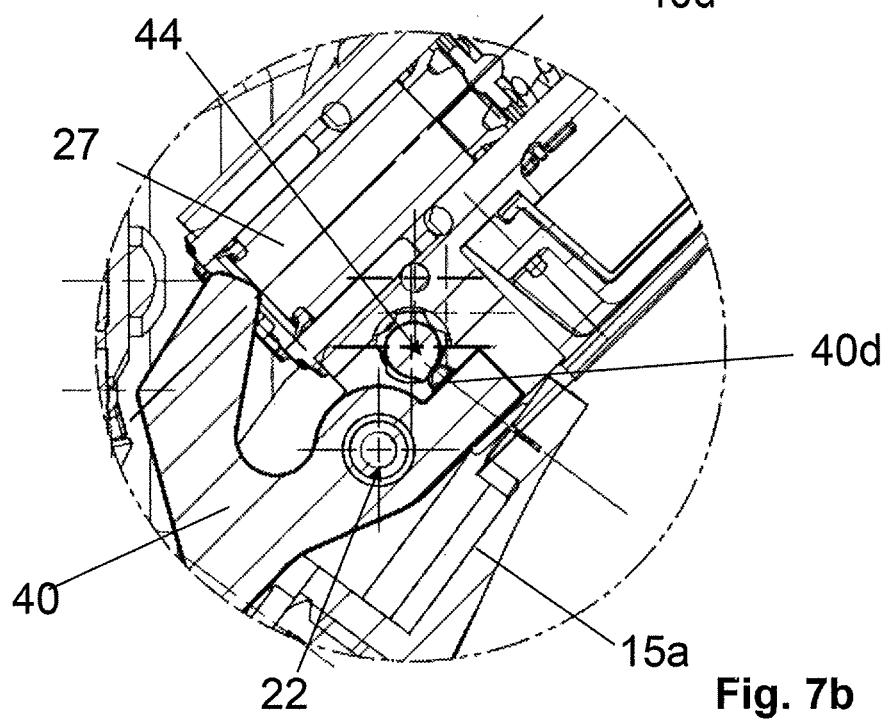

The substantially cylindrical selector 44 has a cam-shaped outer profile 44a, as shown in FIGS. 7a and 7b.

The cam-shaped outer profile 44a of the selector 44 cooperates with the hammer 40.

The selector 44 is rotatable in a predetermined number of positions in which the hammer 40 changes an initial rest position of the piston 27 in the hydraulic cylinder 26 into a respective predetermined number of initial rest positions.

The selector 44 is preferably mounted on the cartridge 24 before it is inserted into the seat 20d of the housing body 20.

The hammer 40 comprises, at an opposite end 40c with respect to the thrust end 40a, a contact element 40d cooperating with the cam-shaped outer profile of the selector 44.

The adjustment screw 42 acts in abutment on the hammer 40 on the opposite part of the opposite end 40c of the hammer 40 with respect to the hole 40a of the hammer 40.

Figure 6A:
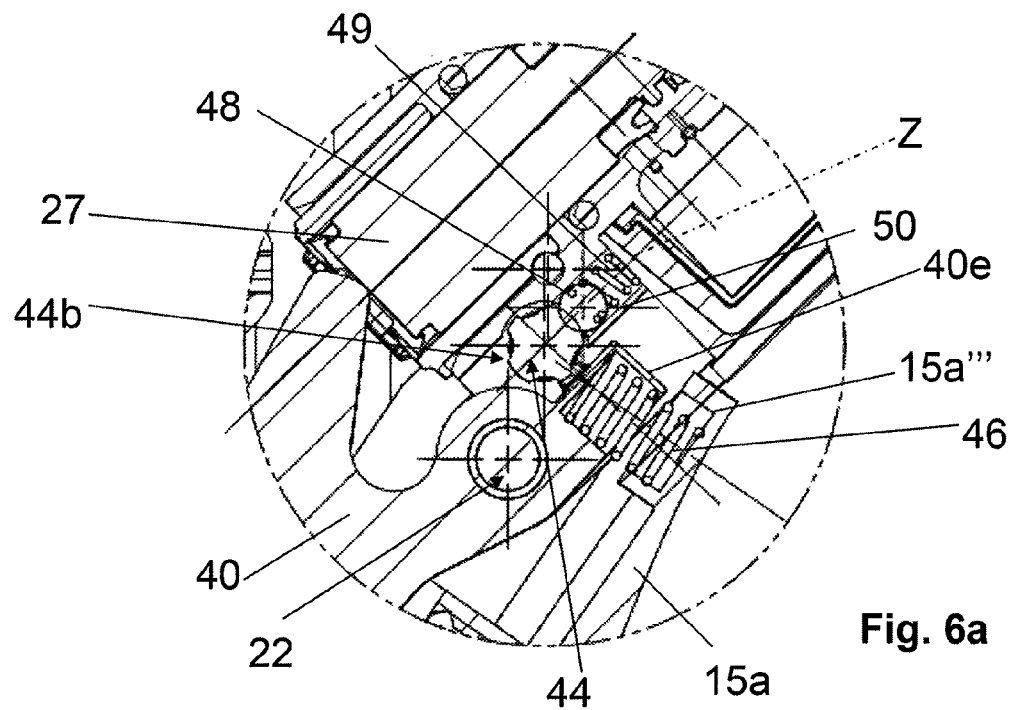
FIGS. 6a and 7b are enlarged views of parts analogous to that circled with a dotted and dashed line in FIG. 4c, with a selector (being part of adjustment members of a brake lever) in two different positions.
Figure 6B:
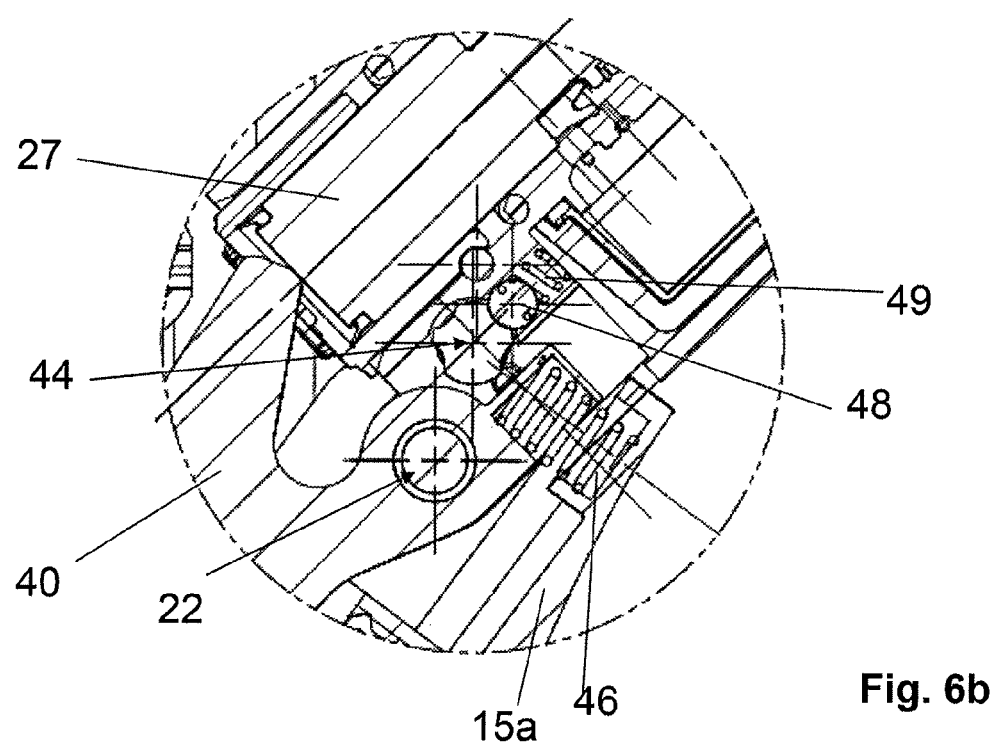

In order to ensure the contact between brake lever 15a and the hammer 40, a spring 46 (see FIGS. 6a and 6b) acts between said opposite end 40c of the hammer 40 and the brake lever 15a.

In particular the spring 46 is of helicoidal type and has opposite ends housed in respective seats 40e and 15a''' of the hammer 40 and of the brake lever 15a respectively. The seat 40e is provided at the opposite end 40c on the opposite part with respect to the contact element 40d.

FIGS. 6a, 6b and FIGS. 7a, 7b show that the selector 44 has at least two sections having different profile, at two different heights (as illustrated indeed by FIGS. 6a, 6b and FIGS. 7a, 7b taken according to the parallel planes IV-IV and VII-VII).

FIGS. 7a, 7b show the aforementioned cam-shaped outer profile 44a (having an area of maximum radial projection outwards and having an area of minimum radial projection outwards), whereas FIGS. 7a, 7b show a grooved outer profile with crests and valleys 44b, in the illustrated non-limiting example arranged below the cam-shaped outer profile 44a, arranged more towards the free end of the selector 44.

The grooved outer profile with crests and valleys 44b of the selector 44 cooperates with a ball 48 mounted on a respective spring 49 (for example of helicoidal type). The ball 48 and the spring 49 move along a predetermined axis Z incident with respect to the selector 44, for example oriented towards the axis of the substantially cylindrical selector 44, thanks to the fact to be arranged within guide walls 50 formed on the cartridge 24.

The valleys of the grooved outer profile 44b are sized to house part of the ball 48, pushed by the spring 49 (that rests on a wall of the cartridge 24, on an opposite part to that where the ball 48 is arranged). By rotating the selector 44, a plurality of rotation positions are defined when the part of the ball 48 is housed in the valleys (for example four like in the illustrated non-limiting example).

In this way, the aforementioned predetermined number (four, in the case of the illustrated non-limiting example) of positions in which the hammer 40 changes the initial rest position of the piston 27 in the hydraulic cylinder 26.

Indeed, different angular positions of the cam-shaped outer profile 44a of the selector 44 correspond to different angular positions of the grooved outer profile with crests and valleys 44b of the selector 44, which determines a displacement of the contact element 40d of the hammer 40, which in turn indeed changes the initial rest position of the piston 27 in the hydraulic cylinder 26 (as can be seen from the comparison of FIGS. 6a, 7a and 6b, 7b, which show indeed two different angular positions of the selector 44).

The operation of the hydraulic brake control device 14 for bicycle handlebar 10 is clear from the above description and is summarized hereafter.

In mounting step of the control device 14, the cartridge 24 is inserted into the seat 20d of the housing body 20.

Preferably, the hammer 40 is mounted on the cartridge 24 before it is inserted into the seat 20d of the housing body 20.

Then the pin 22 is introduced into the holes 20c, 24a, 40a of the housing body 20, cartridge 24 and hammer 24, respectively, so as to simultaneously obtain the locking in position of the cartridge 24 and the hinging of the brake lever 15a and of the hammer 40.

The cyclist then proceeds to actuate the adjustment members adapted for adjusting the rest position and the position of braking start of the brake lever 15a with respect to the housing body 20, so as to adapt the control device 14 to the dimension and physiological characteristics of the hands of the cyclist and choose a desired grade of response promptness of the braking.

In particular, the cyclist screws or unscrews the adjustment screw 42 substantially to modify the rest position of the brake lever 15a, i.e. when the brake lever 15a is completely released by the cyclist.

The cyclist rotates the substantially cylindrical selector 44 and brings it into the preselected angular position, so as to set the initial rest position of the piston 27 in the hydraulic cylinder 26 and consequently the grade of response promptness of the braking desired by him.

The return spring 29 allows the brake lever 15a to be brought back into the completely released rest position when the cyclist stops actuating the brake lever 15a.

Of course, a man skilled in the art can bring several changes and variants to the hydraulic brake control device for a bicycle handlebar described above, in order to satisfy specific and contingent requirements, all of which are in any case encompassed by the scope of protection of the present invention as defined by the following claims.

For example, the hydraulic brake control device of the invention could control a hydraulic rim brake instead of the hydraulic disc brake that is illustrated in FIG. 1, in which the brake calipers act on the bicycle rim instead of on a disc. Also not excluded is the case in which the two hydraulic brake control devices control a hydraulic disc brake (for example for the brake of the front wheel) and a hydraulic rim brake (for example for the brake of the rear wheel).

What is claimed is:

1. A hydraulic brake control device for a handlebar of bicycle, comprising a hydraulic brake actuator mounted on a housing body, said housing body comprising a handgrip portion and an attachment portion to the handlebar of bicycle, wherein said hydraulic brake actuator comprises:
a brake lever hinged on said housing body through a pin;
a hydraulic cylinder wherein a piston is connected to said brake lever through kinematic connection elements; and
a tank for hydraulic fluid in fluid communication with said hydraulic cylinder;
wherein said control device comprises an autonomous cartridge that comprises said hydraulic cylinder and said tank, said autonomous cartridge is removably inserted into a corresponding seat formed in a head portion of said housing body that is substantially opposite said attachment portion and said autonomous cartridge is retained in said seat by said pin.

2. A hydraulic brake control device for a handlebar of bicycle, comprising a hydraulic brake actuator mounted on a housing body, said housing body comprising a handgrip portion and an attachment portion to the handlebar of bicycle, wherein said hydraulic brake actuator comprises:
a brake lever hinged on said housing body through a pin;
a hydraulic cylinder wherein a piston is slidable that is kinematically connected to said brake lever through kinematic connection elements; and
a tank for hydraulic fluid in fluid communication with said hydraulic cylinder;
wherein said control device comprises an autonomous cartridge that comprises said hydraulic cylinder and said tank and that is removably inserted into a corresponding seat of said housing body, said seat being formed in a head portion of said housing body that is substantially opposite said attachment portion, wherein said cartridge comprises a hole wherein said pin of said brake lever is inserted when said cartridge is inserted into said seat.

3. The control device according to claim 2, wherein said cartridge has an end that faces out of the housing body.

4. The control device according to claim 3, wherein said housing body handgrip portion is accessible when said control device is mounted on the handlebar.

5. The control device according to claim 2, wherein a shape coupling is provided between said cartridge and said seat.

6. The control device according to claim 2, wherein said kinematic connection elements comprise a single hammer acting between said piston and said brake lever.

7. The control device according to claim 6, wherein said hammer is hinged on said housing body through said pin.

8. The control device according to claim 7, wherein said hammer is substantially U-shaped and comprises a hole where said pin is inserted and a thrust end acting on said piston.

9. The control device according to claim 8, wherein said hammer is positioned so that said thrust end acts on said piston in substantially axial direction.

10. The control device according to claim 2, further comprising adjustment members adapted for adjusting at least one of a rest position or a position of braking start of said brake lever with respect to said housing body.

11. Control device according to claim 10, wherein said kinematic connection elements comprise a single hammer acting between said piston and said brake lever, said adjustment members comprise an adjustment screw screwed within a threaded hole associated with said brake lever, said adjustment screw acting in abutment on said hammer.

12. Control device according to claim 10, wherein said kinematic connection elements comprise a single hammer acting between said piston and said brake lever, said adjustment members comprise a substantially cylindrical selector having a cam-shaped outer profile that cooperates with said hammer, said selector being rotatable in a predetermined number of positions in which said hammer modifies an initial rest position of said piston in said hydraulic cylinder into a respective predetermined number of initial rest positions, said selector being mounted on said cartridge.

13. Control device according to claim 12, wherein said hammer comprises, at an opposite end with respect to a thrust end, a contact element cooperating with said cam-shaped outer profile of said selector.

14. Control device according to claim 11, wherein said adjustment screw acts in abutment on said hammer on the opposite part of an opposite end of the hammer with respect to said hole of the hammer, a spring acting between said opposite end of said hammer and said brake lever.

15. The control device according to claim 2, wherein said hydraulic cylinder comprises a side hole equipped with a joining duct to a braking tube connected to the brake of bicycle.

16. The control device according to claim 2, wherein said cartridge is made from different material with respect to said housing body, with greater structural strength with respect to said housing body.

17. The control device according to claim 2, wherein a gear actuation device is also mounted on said housing body and comprises a gear lever and/or button forming an integrated control of hydraulic brake and gear.

18. The control device according to claim 17, wherein said gear actuation device is a mechanical gear actuation device or an electric gear actuation device.

* * * * *